(12) United States Patent
Ramlall

(10) Patent No.: US 9,419,840 B1
(45) Date of Patent: Aug. 16, 2016

(54) ADAPTIVE OFDM SYNCHRONIZATION METHOD USING QUADRATIC SEARCH STEP SIZES

(71) Applicant: The United States of America as represented by the Secretary of the Navy, Washington, DC (US)

(72) Inventor: Rohan Y. Ramlall, Brentwood, CA (US)

(73) Assignee: THE UNITED STATES OF AMERICA AS REPRESENTED BY THE SECRETARY OF THE NAVY, Washington, DC (US)

(*) Notice: Subject to any disclaimer, the term of this patent is extended or adjusted under 35 U.S.C. 154(b) by 0 days.

(21) Appl. No.: 14/734,573

(22) Filed: Jun. 9, 2015

Related U.S. Application Data

(63) Continuation-in-part of application No. 14/091,048, filed on Nov. 26, 2013, now Pat. No. 9,083,596.

(51) Int. Cl.
*H04L 27/26* (2006.01)
(52) U.S. Cl.
CPC ........ *H04L 27/2659* (2013.01); *H04L 27/2607* (2013.01); *H04L 27/2665* (2013.01)
(58) Field of Classification Search
USPC .................................. 375/260, 340, 347, 227
See application file for complete search history.

(56) References Cited

U.S. PATENT DOCUMENTS

| | | | | |
|---|---|---|---|---|
| 7,630,463 | B2* | 12/2009 | Shin | ..................... H04L 27/2657 375/260 |
| 8,218,665 | B2 | 7/2012 | Chin et al. | |
| 8,243,777 | B2* | 8/2012 | Yang | ................... H04L 27/2672 370/500 |
| 8,625,684 | B2* | 1/2014 | Kim | ..................... H04L 27/2695 370/203 |
| 9,160,589 | B1* | 10/2015 | Ramlall | ................... H04L 27/26 |
| 2009/0323843 | A1* | 12/2009 | Yang | ................... H04L 27/2672 375/260 |

FOREIGN PATENT DOCUMENTS

EP 1330087 A2 * 7/2003 .......... H04L 27/2662

OTHER PUBLICATIONS

J. Diez, D. De Castro, J.M. Palomo, M. Tossaint, "Integrated navigation and communication system based on OFDM," 2010 5th ESA Workshop on Satellite Navigation Technologies and European Workshop on GNSS Signals and Signal Process. NAVITEC, pp. I-5, Dec. 8-10, 2010.

(Continued)

*Primary Examiner* — Eva Puente
(74) *Attorney, Agent, or Firm* — SPAWAR Systems Center Pacific; Kyle Eppele; Ryan J. Friedl

(57) ABSTRACT

A system and method involve receiving a plurality of samples of at least one orthogonal frequency division multiplex (OFDM) signal, the samples containing at least one complete OFDM symbol including data samples and a cyclic prefix, using an initial symbol timing offset (STO) estimate to initialize an N×1 vector of occupation probabilities $\alpha$, where N is the number of sub-carriers of the OFDM signal, and, for each subsequent set m of OFDM samples received containing at least one complete OFDM symbol, determining a STO estimate from a set of candidate STO estimates, updating the vector of occupation probabilities $\alpha$, and determining a final STO estimate. The final STO estimate is used to determine a carrier frequency offset and may be determined using the STO estimate with the highest occupation probability.

20 Claims, 8 Drawing Sheets

(56) References Cited

OTHER PUBLICATIONS

F. Zanier, M. Luise, "Fundamental issues in time-delay estimation of multicarrier signals with applications to next-generation GNSS," 2008 SPSC 10th Int. Workshop on Signal Process for Space Commun., vol., No., pp. I-8, Oct. 6-8, 2008.

J.J. Van De Beek, M. Sandell, P.O. Botjesson, "ML estimation of time and frequency offset in OFDM systems," IEEE Trans. Signal Process, vol. 45, No. 7, pp. I800-1805, Jul. 1997.

D. Landstrom, S. Wilson, J.J. Van De Beek, P. Odling, P.O. Botjesson, "Symbol time offset estimation in coherent OFDM systems," IEEE Trans. Commun., vol. 50, No. 4, pp. 545-549, Apr. 2002.

J.A. Lopez-Salcedo, E. Gutierrez G. Seco-Granados, A.L. Swinehurst, "Unified framework for the synchronization of flexible multicarrier communication signals," IEEE Trans. Signal Process., vol. 61, No. 4, pp. 828-842, Feb. 2013.

W.L. Chin, "ML Estimation of Timing and Frequency Offsets Using Distinctive Correlation Characteristics of OFDM Signals Over Dispersive Fading Channels," IEEE Trans. Veh. Technology, vol. 60, No. 2, pp. 444-456, Feb. 2011.

D. Lee; K. Cheun, "Coarse symbol synchronization algorithms for OFDM systems in multipath channels," IEEE Commun. Lett., vol. 6, No. 10, pp. 446-448, Oct. 2002.

R. Mo, Y. Chew, T. Tjhung, C. Ko, "A joint blind timing and frequency offset estimator for OFDM systems over frequency selective fading channels," IEEE Trans. Wireless Commun., vol. 5, No. 9, pp. 2594-2604, Sep. 2006.

R. Martin, J. Velotta, J. Raquet, "Bandwidth Efficient Cooperative TDOA Computation for Multicarrier Signals of Opportunity," IEEE Trans. Signal Process., vol. 57, No. 6, pp. 2311-2322, Jun. 2009.

M. Speth, F. Classen, H. Meyr, "Frame synchronization of OFDM systems in frequency selective fading channels," 1997 IEEE 47th Veh. Technology Conf., vol. 3, No., pp. 1807-1811, May 4-7, 1997.

J. McNeff, "Changing the Game Changer—The Way Ahead for Military PNT," Inside GNSS, vol. 5, No. 8, pp. 44-51, Dec. 2010.

3GPP, "Technical Specification Group Radio Access Network; Deployment aspects," TR 25.943, Sep. 2012, V11.0.0.

Krishnamurthy, V. et al., "Adaptive OFDM synchronization algorithms based on discrete stochastic approximation," IEEE Trans. Signal Process., vol. 53, No. 4, pp. 1561-1574, Apr. 2005.

Chen, J., et al., "Adaptive OFDM synchronization algorithm in frequency selective fading channels," IEEE Trans. Consum. Electron., vol. 55, No. 4, pp. 1841-1846, Nov. 2009.

Simeone, O., et al., "Pilot-based channel estimation for OFDM systems by tracking the delay-subspace," IEEE Trans. Wireless Commun., vol. 3, No. 1, pp. 315-325, Jan. 2004.

3GPP, "Technical Specification Group Radio Access Network; E-UTRA; BS radio transmission and reception ," TS 136.104, Jan. 2013, V11.3.1., http://www.etsi.org/deliver/etsi_ts/136100_136199/136104/09.04.00_60/ts_136104v090400p.pdf.

* cited by examiner

ADAPTIVE OFDM SYNCHRONIZATION METHOD USING QUADRATIC SEARCH STEP SIZES

CROSS-REFERENCE TO RELATED APPLICATIONS

This application is a continuation-in-part of U.S. Non-Provisional patent application Ser. No. 14/091,048 filed Nov. 26, 2013, entitled "Non-Data-Aided Joint Time and Frequency Offset Estimate Method for OFDM Systems Using Channel Order Based Regression", the content of which is fully incorporated by reference herein.

FEDERALLY-SPONSORED RESEARCH AND DEVELOPMENT

The Adaptive OFDM Synchronization Method Using Quadratic Search Step Sizes is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 102677.

BACKGROUND

Orthogonal frequency division multiplexing (OFDM) is a prevalent multicarrier modulation method that has been adopted in numerous standards such as IEEE 802.11a/g/p, LTE, and DVB-T/T2. Key advantages of OFDM are its high spectral efficiency, ability to equalize wideband channels, and its robustness to inter-symbol interference (ISI). However, OFDM is sensitive to time and frequency offsets which need to be estimated in order to demodulate the received data with low bit error rate. Much research has focused on blindly estimating these offsets, as blind estimators have the advantage of not requiring any known training data to estimate some desired parameter, thus preserving high bandwidth efficiency. Further, blind estimators do not require any knowledge of the channel.

A major drawback of proposed estimation methods is that they are high in computational complexity, which increases power consumption and reduces the lifetime of the communications device. There is a need for an adaptive real-time OFDM synchronization method with reduced computational complexity.

DETAILED DESCRIPTION OF SOME EMBODIMENTS

The subject matter disclosed herein involves a blind, real-time, low complexity, and adaptive synchronization method for OFDM systems. The embodiments of the method utilize a quadratically increasing search step size to track large changes in symbol time offset (STO), and a joint estimate of the STO and carrier frequency offset (CFO) is produced as each symbol is received, resulting in better tracking accuracy in terms of mean squared error (MSE) than existing adaptive and non-adaptive algorithms. The disclosed embodiments also achieve more robust tracking with quicker convergence times than existing adaptive algorithms.

In general, the low-pass frequency-selective channel model is given by $$h(t) = \sum_{l=0}^{L-1} h_l \delta(t - lT_s) \qquad \text{(Eq. 1)}$$

where L is the order of the channel, $h_l$ is the complex amplitude of the l-th multipath arrival, and $T_s$ is the sampling period. The channel is assumed to stay unchanged over the duration of a couple of OFDM symbols. The transmitted OFDM symbol s(n) n=0, . . . , $N+N_{cp}-1$ is produced by taking the N point inverse fast Fourier transform (IFFT) of the modulated data symbols $\{x_d, d=0, \ldots, N-1\}$ and pre-pending the last $N_{cp}$ samples. It is assumed that the channel order is less than or equal to the length of the cyclic prefix (i.e., $L \leq N_{cp}$). Hence, the correlation between the transmitted OFDM symbol's data portion and its cyclic prefix is given by $$E[s(a)s^*(b)] = \begin{cases} \sigma_s^2, & \text{if } a = b \quad b \in \{0, \ldots, N+N_{cp}-1\} \\ \sigma_s^2, & \text{if } a = b+N \quad b \in \{0, \ldots, N_{cp}-1\} \\ \sigma_s^2, & \text{if } a = b-N \quad b \in \{N, \ldots, N+N_{cp}-1\} \\ 0, & \text{otherwise} \end{cases} \quad \text{(Eq. 2)}$$

where $\sigma_s^2$ is the signal power. After convolution with the channel, the samples of the received OFDM symbol at the receiver are given by $$r(k) = e^{j2\pi \epsilon k/N} \sum_{l=0}^{L-1} h(l)s(k-l) + n(k) \quad k = \theta, \ldots, \theta + N + N_{cp} - 1 \quad \text{(Eq. 3)}$$

where $\theta \in [0, N-1]$ is the integer STO, $\epsilon \in (-0.5, 0.5]$ is the CFO normalized to $1/NT_s$, and n is additive white Gaussian noise (AWGN) with variance $\sigma_n^2$. The received OFDM signal is assumed to be critically sampled (i.e. $N+N_{cp}$ samples per OFDM symbol), and the STO $\theta$ is defined to be the first arrival path received (i.e., the first sample of the received OFDM symbol still including the cyclic prefix). Due to the circular convolution between the OFDM symbol and channel, the received cyclic prefix has L-1 samples corrupted by ISI and $N_{cp}-L+1$ ISI-free samples.

Figure 1A:
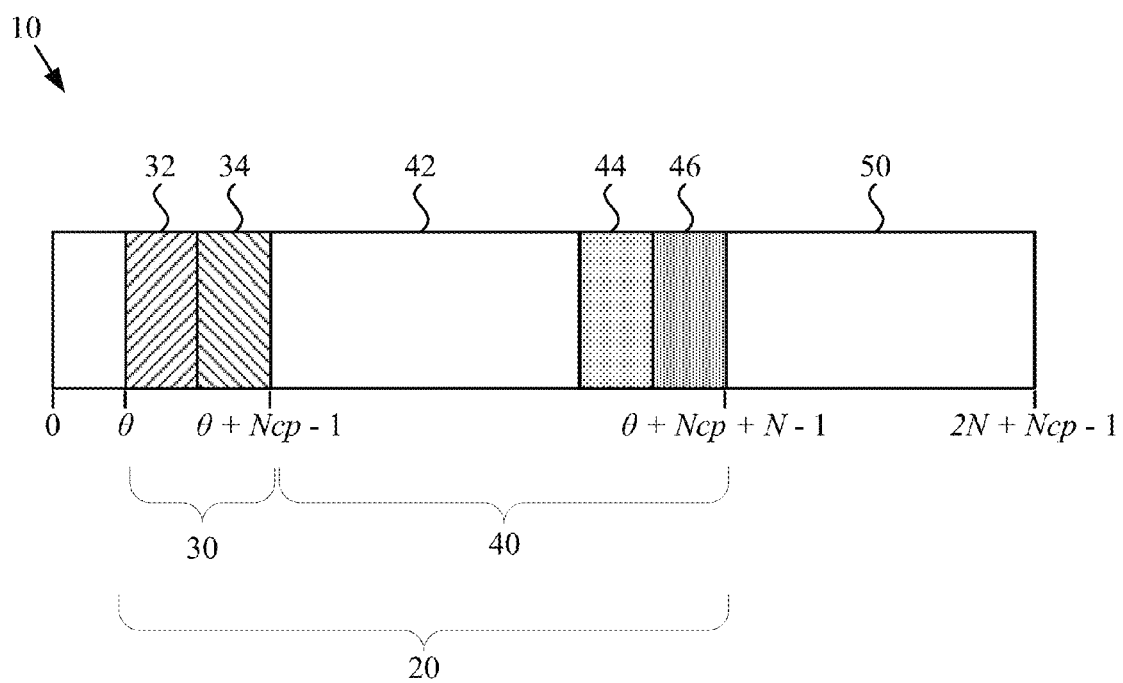
FIG. 1A shows a diagram of an OFDM signal containing a complete OFDM data symbol.
Figure 1B:
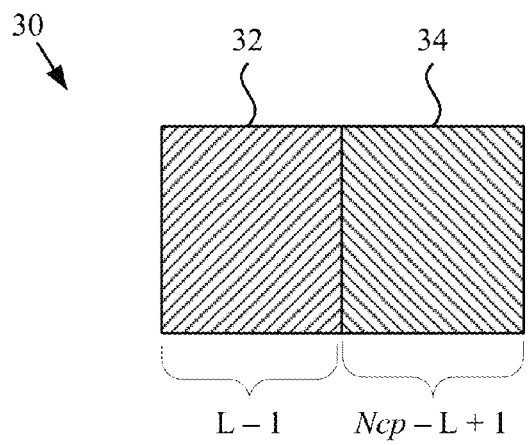
FIG. 1B shows a diagram of the cyclic prefix portion of the OFDM data symbol shown in FIG. 1.

FIG. 1A shows a received OFDM signal 10 containing a complete OFDM symbol 20. Symbol 20 includes a cyclic prefix 30 and a data portion 40. Cyclic prefix includes an inter-symbol interference (ISI) region 32 and an ISI-free region 34. Data portion 40 includes a first data portion 42, a second data portion 44, and a third data portion 46. Data portion 40 contains samples representing the transmitted OFDM symbol. First data portion 42 represents the samples that have not been affected by interference. Second data portion 44 is a data region that corresponds to ISI region 32. Third data portion 46 is a data region that corresponds to ISI-free region 34. As shown in FIG. 1B, ISI region 32 has a length of L-1 and ISI-free region 34 has a length of $N_{cp}-L+1$.

Reference will now be made to a non-adaptive time and frequency estimation method that may be used in some embodiments discussed herein. A conventional blind estimator, such as the conditional maximum likelihood (CML) estimator, may be used to determine initial STO and CFO estimates. The STO estimate using CML is given by:

$$\hat{\theta}^* = \underset{\theta \in [0,N-1]}{\arg\max} J(\hat{\theta}) \quad \text{(Eq. 4)}$$

where the cost function is given by:

$$J(\hat{\theta}) = \sum_{m=0}^{M-1} \left\{ -\frac{1}{2} \sum_{k=\hat{\theta}}^{\hat{\theta}+N_{cp}-1} [ \right. \quad \text{(Eq. 5)}$$

$$|r(k+m(N_{cp}+N))|^2 + |r(k+N+m(N_{cp}+N))|^2] +$$

-continued $$\left. \left| \sum_{k=\hat{\theta}}^{\hat{\theta}+N_{cp}-1} r(k+m(N_{cp}+N))r^*(k+N+m(N_{cp}+N)) \right| \right\}$$

and the CFO estimate is given by:

$$\hat{\epsilon}^* = -\frac{1}{2\pi}\arg \quad \text{(Eq. 6)}$$

$$\left\{ \sum_{m=0}^{M-1} \sum_{k=\hat{\theta}^*}^{\hat{\theta}^*+N_{cp}-1} r(k+m(N_{cp}+N))r^*(k+N+m(N_{cp}+N)) \right\}$$

The integer STO is defined to be the first arrival path received and is assumed to be less than the number of subcarriers N (i.e., $\theta \in [0, N-1]$). $N_{cp}$ is the length of the cyclic prefix, r(k) is the kth received sample of the critically sampled (i.e., $N+N_{cp}$ samples per OFDM symbol) OFDM signal, M is the number of OFDM symbols used, and the normalized CFO $\epsilon \in (-0.5, 0.5]$.

This blind estimator has low computational complexity and is similar to a widely adopted estimator of van de Beek et al., without the signal-to-noise ratio (SNR) factor. Further, its performance agrees with the van de Beek estimator for high SNR. Conventionally, the cost function as shown in (Eq. 5) is evaluated for each $\hat{\theta} \in [0, N-1]$, which is computationally expensive for large N or M. To reduce the computational complexity and make the synchronization algorithm suitable for real-time tracking of the STO and CFO, an adaptive algorithm is desirable.

In some the embodiments of the method disclosed herein, an estimate of the STO and CFO is produced with every symbol received. In other embodiments, the estimates are produced when multiples symbols are received. Also, the embodiments do not require unnecessary computations at each of the N possible STO estimates—only a small subset of them.

Figure 2:
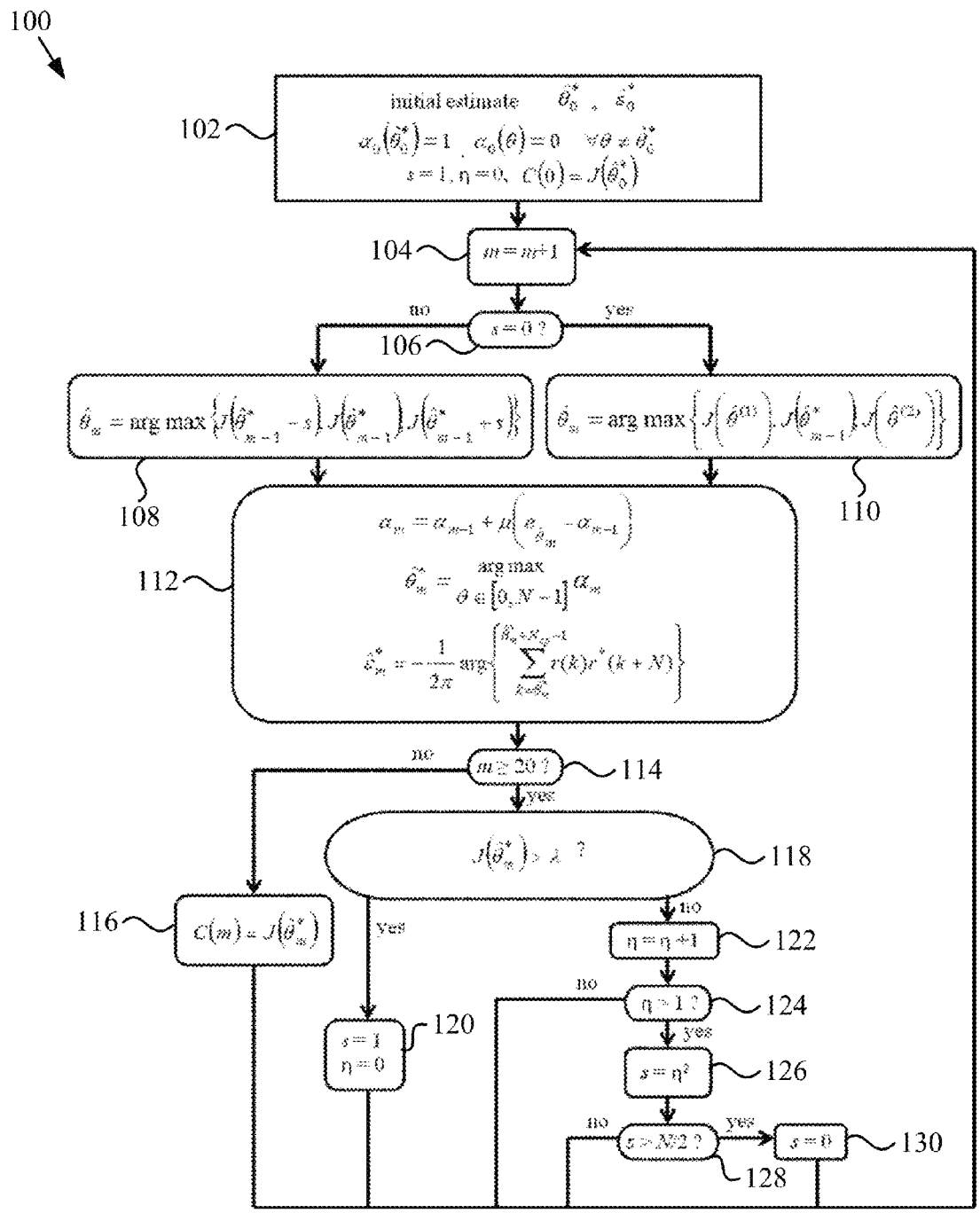
FIG. 2 shows a flow diagram of an embodiment of a method in accordance with the Adaptive OFDM Synchronization Method Using Quadratic Search Step Sizes.

FIG. 2 shows a flow diagram of an embodiment of a method 100 in accordance with the Adaptive OFDM Synchronization Method Using Quadratic Search Step Sizes. At box 102, the method is initialized using the STO and CFO estimates provided by the non-adaptive approach, such as discussed above, on the first $2N+N_{cp}$ received samples. It is assumed that the initial STO estimate $\hat{\theta}_0^*$ is close (i.e., within 10 samples) to the true STO. It should be recognized however, that any blind estimator can be used to initialize the method (and as the cost function), but the above-mentioned estimator is used for the reasons stated above.

The N×1 vector of occupation probabilities α is initialized accordingly based on this initial STO estimate and the search step size (in samples) s is set to one. To be clear, α measures the probability that a STO estimate yields the highest cost function. Recall that there are N possible STO estimates since $\theta$ is assumed to be less than the number of subcarriers N (i.e., $\theta \in [0, N-1]$). Hence, α is initialized to a N×1 vector of zeros except for $\alpha(\hat{\theta}_0^*)$, which is set equal to 1. As will be discussed shortly, η is used to keep track of the intervals (in symbols) when the STO estimate has not yet converged; it is initially set to zero.

At box 104, the symbol m is incremented by one. For each subsequent symbol, the STO estimate is determined by selecting the STO estimate from the set $\{\hat{\theta}_{m-1}^*-s, \hat{\theta}_{m-1}^*, \hat{\theta}_{m-1}^*+s\}$ at box 108 or $\{\hat{\theta}^{(1)}, \hat{\theta}_{m-1}^*, \hat{\theta}^{(2)}\}$ at box 110, yielding the maximum cost function, depending on whether or not s equals 0. $\hat{\theta}^{(1)}$ and $\hat{\theta}^{(2)}$ are uniformly distributed random STO estimates on [0,N−1] where $\hat{\theta}^{(1)} \neq \hat{\theta}^{(2)} \neq \hat{\theta}_{m-1}^*$. As will be explained later, the value s is set to zero to prevent the algorithm from diverging. Another precaution taken to prevent divergence is that each STO estimate from the set $\{\hat{\theta}_{m-1}^* - s, \hat{\theta}_{m-1}^* + s\}$ is always checked to ensure it is within the interval [0,N−1]. If either estimate is less than 0, it is set equal to 0; and if either estimate is greater than N−1, it is set equal to N−1.

At box 112, the occupation probability is then updated according to $$\alpha_m = \alpha_{m-1} + \mu(e_{\hat{\theta}_m} - \alpha_{m-1}) \quad \text{(Eq. 7)}$$

where $e_{\hat{\theta}_m}$ is a N×1 unit vector with a one in the $\hat{\theta}_m$th position and μ is the step-size. Note the distinction between the step-size μ and the search step size s. Also at box 112, the STO and CFO estimates are then produced from the STO estimate with the highest occupation probability, denoted by $\alpha_{peak}$.

Figure 3:
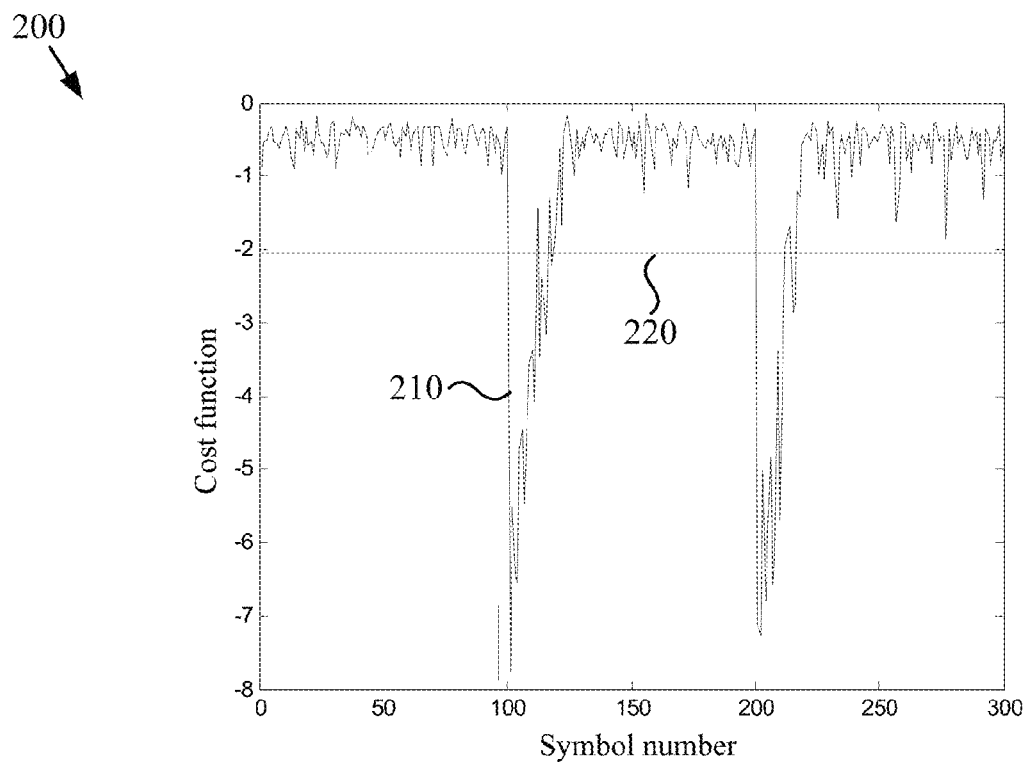
FIG. 3 shows a graph illustrating the mean cost function for four realizations, for a 3GPP Rax channel IEEE 802.11a ($E_s/N_o$=5 dB), of a method in accordance with the Adaptive OFDM Synchronization Method Using Quadratic Search Step Sizes.

The method disclosed herein uses the cost function of the STO estimate to determine the search step size s. As shown in graph 200 of FIG. 3, when there is a large change in STO and the algorithm has not yet converged, the cost function shown by line 210 is less than when it is tracking the STO. Therefore, large changes in STO can be detected by monitoring the cost function of the STO estimate. The current cost function is compared to a threshold λ shown by line 220 to determine whether a large change in STO has occurred and if the algorithm has converged yet. A good value for λ was empirically determined to be four times the average of the first 20 symbols' cost functions, i.e., $$\lambda = 4 \times \frac{1}{20} \sum_{m=0}^{19} J(\hat{\theta}_m^*) \quad \text{(Eq. 8)}$$

It is assumed that the STO is somewhat constant (i.e., $|\theta_m - \theta_{m-1}| \leq 1$) for the first 20 symbols so that no large change in STO occurs. This assumption is reasonable since the STO varies slowly with time. Accordingly, box 114 determines if m≥20. If not, at box 116, element m of a buffer C of the cost functions is set equal to $J(\hat{\theta}_m^*)$. The method then proceeds back to box 104. If it is determined that m is greater than or equal to 20, at box 118 the current cost function is compared to threshold λ to determine if it is greater.

If the current cost function is greater than λ, the algorithm has converged, so at box 120 the value s is set to one and η is set to zero. If the current cost function is less than λ, the algorithm has not yet converged. Thus, at box 122 the value η is incremented by one and s is set as is described below. This results in a quadratically increasing search step size with the goal of decreasing the convergence time. It should be noted that this increase in search step size is a larger increase in search step size compared to other methods which only increase search step size by one sample per symbol.

Box 124 then determines whether η>1. If not, then method proceeds back to box 104. If so, s is set equal to $\eta^2$ at box 126. At box 128, a determination is made as to whether s>N/2. If not, the method proceeds back to box 104. If so, at box 130 s is set equal to zero and then the method proceeds back to box 104. The setting of s to zero results in random candidate STO estimates in order to prevent permanent divergence (since two of the three candidate estimates could be wasted by investigating the STO estimates 0 and N−1 if s is too large).

The disclosed embodiments utilize the cost function to make their performance independent of the channel. As long as the channel is not rapidly changing (i.e., its power delay profile is constant over multiple OFDM symbols), λ can be used to determine when a large change in STO has occurred to switch the convergence mode from local to global. If the channel is rapidly changing, λ can be updated periodically. What constitutes a good value for λ is that only large changes, not small changes, in STO should result in the cost function falling below λ.

While previous methods combine the local and global convergent modes into one algorithm, which mode the algorithm is in is determined by comparing $\alpha_{peak}$ to t a gate value $\alpha_{gate}$. It is difficult to determine a good value for $\alpha_{gate}$ and it varies case-by-case since it depends on the maximum value of α, which varies with the channel, step-size, and mode the algorithm is in.

Also in previous methods, the number of complex multiplications performed is used to measure the computational complexity. The computational complexity of the non-adaptive estimator discussed above is $3(N+N_{cp})$ for each symbol if three buffers of size $N_{cp}$ are are used.

The embodiments of the method disclosed herein utilize three buffers of size $N+N_{cp}$ to avoid doing the same complex multiplication more than once. When the method is tracking small changes in the STO (i.e., s=1), only the cost functions of adjacent STO estimates are evaluated, so only $3(N_{cp}+2)$ complex multiplications are performed. In the rare occurrence of large changes in STO, the method can perform up to $3(3N_{cp})=9N_{cp}$ complex multiplications since the sets of STO estimates (i.e., $\{\hat{\theta}_{m-1}^* - s, \hat{\theta}_{m-1}^*, \hat{\theta}_{m-1}^* + s\}$ and $\{\hat{\theta}^{(1)}, \hat{\theta}_{m-1}^*, \hat{\theta}^{(2)}\}$) might not share any complex multiplications.

Since the STO varies slowly with time, changes in the STO are somewhat rare events that occur on the order of hundreds of symbols, so the computational complexity of the estimator disclosed herein is approximately a factor of $3(N_{cp}+2)/3(N+N_{cp}) = (N_{cp}+2)/(N+N_{cp})$ of the non-adaptive estimator. For the OFDM signal specifications for, as an example, IEEE 802.11a (channel bandwidth 20 MHz, FFT Size N=64, cyclic prefix length $N_{cp}$=16) and LTE (channel bandwidth 1.4 MHz, FFT Size N=128, cyclic prefix length $N_{cp}$=10), this factor is (16+2)/(64+16)=0.225 for IEEE 802.11a and (10+2)/(128+10)=0.087 for the smallest bandwidth LTE signal.

As shown in FIGS. 4-9, the performance of the method disclosed herein is compared to the non-adaptive estimator discussed above, an algorithm as discussed in a publication by Krishnamurthy et al., "Adaptive OFDM synchronization algorithms based on discrete stochastic approximation", *IEEE Trans. Signal Proc.*, vol. 53, no. 4, pp. 1561-74, April 2005 ("Krishnamurthy estimator") and an algorithm as discussed in a publication by Chen et al., "Adaptive OFDM synchronization algorithm in frequency selective fading channels," *IEEE Trans. Consum. Electron.*, vol. 55, no. 4, pp. 1841-46, November 2009 ("Chen estimator").

The comparison is performed through Monte Carlo simulations using 10,000 realizations. Generic OFDM signals are generated similar to those of the IEEE 802.11a and smallest bandwidth LTE signal standards in terms of bandwidth, N, and $N_{cp}$. BPSK modulation and Rayleigh fading channels are used where the channel coefficients are normalized to unit power. The channel remains constant for the first two symbols and then changes subsequently every few symbols, while the CFO is held fixed throughout at ϵ=0.3. All three methods are initialized using the STO and CFO estimates provided by the non-adaptive approach discussed above on the first $2N+N_{cp}$ samples and (Eq. 5) is used as the cost function for subsequent symbols. The value μ=0.9 for the Krishnamurthy estimator and the estimator disclosed herein, whereas μ=0.6 and $\alpha_{gate}$=0.5 for the Chen estimator. In all of the simulations, the initial STO estimate is within ±10 samples of the true STO.

Figure 4:
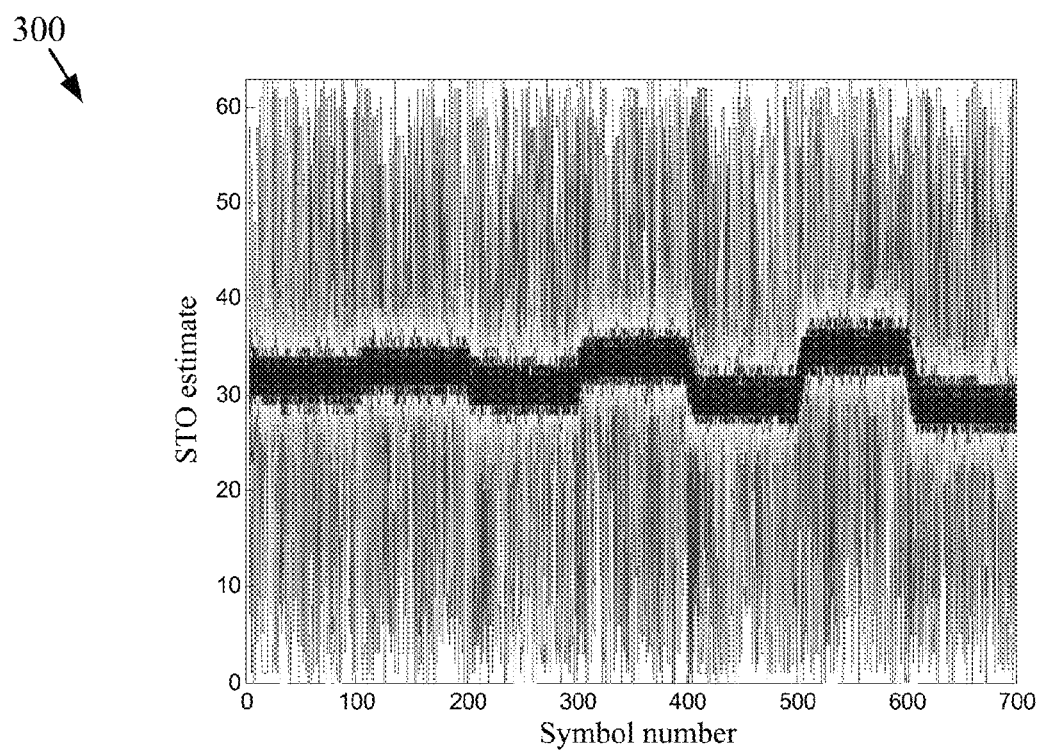
FIG. 4 shows a graph illustrating the STO estimates for a 3GPP Rax channel IEEE 802.11a ($E_s/N_o$=5 dB) for other estimators in comparison to a method in accordance with the Adaptive OFDM Synchronization Method Using Quadratic Search Step Sizes.
Figure 5:
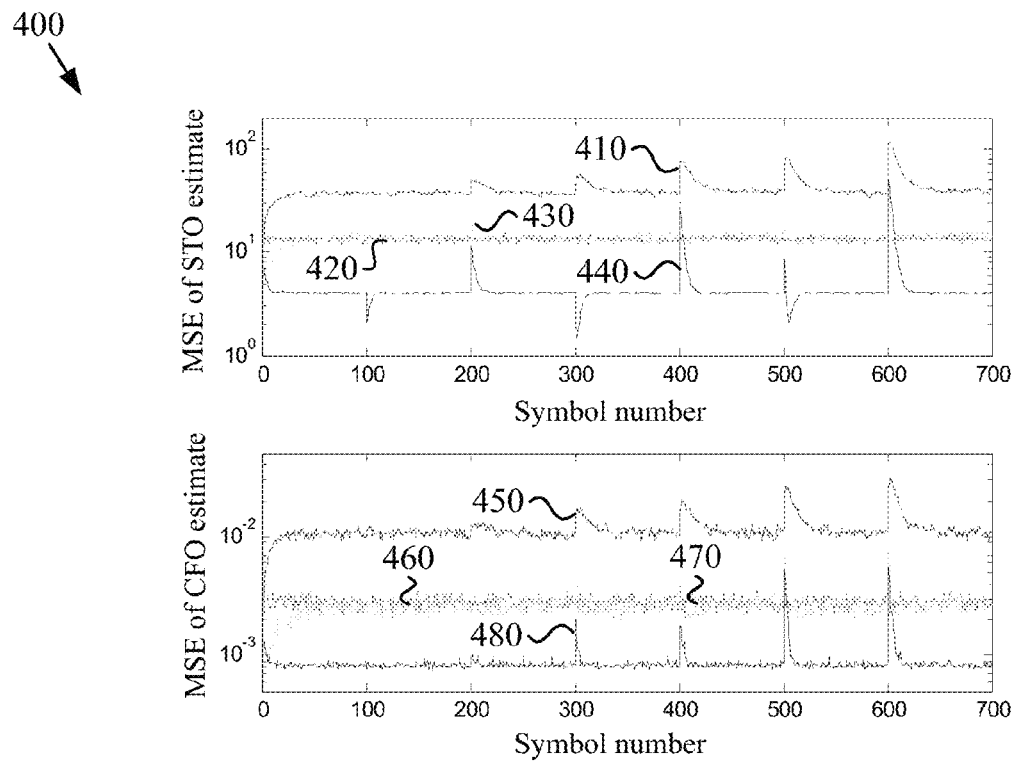
FIG. 5 shows a graph illustrating mean squared error performance, for a 3GPP Rax channel IEEE 802.11a ($E_s/N_o$=5 dB), for other estimators in comparison with a method in accordance with the Adaptive OFDM Synchronization Method Using Quadratic Search Step Sizes.
Figure 6:
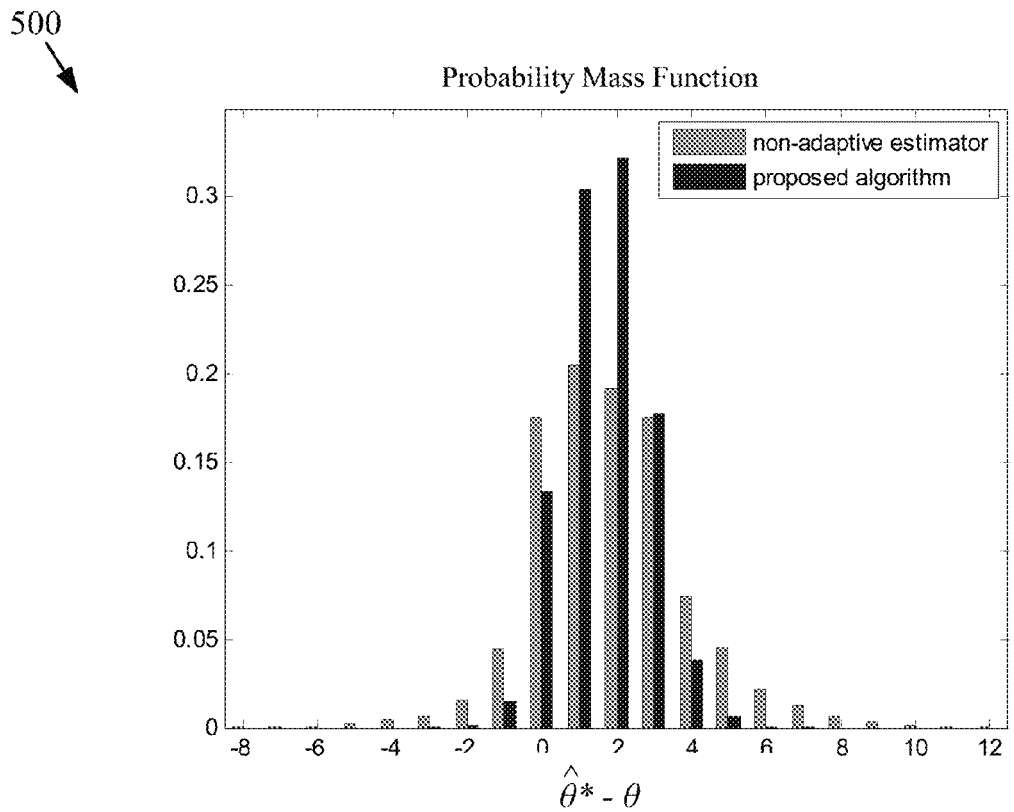
FIG. 6 shows a graph illustrating probability mass function of symbol timing error, for another estimator in comparison to a method in accordance with the Adaptive OFDM Synchronization Method Using Quadratic Search Step Sizes when the method has converged.

In the first scenario, the performances of the methods for small changes in STO are simulated using the 3GPP Rural Area channel (Rax) for IEEE 802.11a, where N=64 and $N_{cp}$=16, which is effectively a twelfth order channel. The true STO is given by $\theta=[30\vec{\mu}\ 31\vec{\mu}\ 29\vec{\mu}\ 32\vec{\mu}\ 28\vec{\mu}\ 33\vec{\mu}\ 27\vec{\mu}]^T$ where $\vec{\mu}$ is a 1×100 vector of ones. FIGS. 4 and 5 show the STO estimates of 100 realizations of each method and the MSE of the 10,000 STO and CFO estimates for each method, respectively for SNR=5 dB. In the graph 300 shown in FIG. 4, the proposed method (the blue line shown near a STO estimate of 30-35) tracks the true STO the best, whereas the other methods fluctuate more.

Referring to graph 400 shown in FIG. 5, the method disclosed herein performs the best followed by the non-adaptive estimator, the Chen estimator, and then the Krishnamurthy estimator, in terms of MSE. The top graph of FIG. 5 shows the MSE of the STO estimate, with line 410 representing estimation performance of the Krishnamurthy estimator, line 420 representing estimation performance of the non-adaptive estimator, line 430 representing estimation performance of the Chen estimator, and line 440 representing estimation performance of the estimator disclosed herein. The bottom graph of FIG. 5 shows the MSE of the CFO estimate, with line 450 representing estimation performance of the Krishnamurthy estimator, line 460 representing estimation performance of the non-adaptive estimator, line 470 representing estimation performance of the Chen estimator, and line 480 representing estimation performance of the estimator disclosed herein.

Compared to the non-adaptive estimator, the STO and CFO estimation performance for the method disclosed herein is over three times better in terms of MSE once the algorithm has converged. The reason for this significant improvement in performance is that when the proposed algorithm has converged, it restricts the set of candidate STO estimates to the previous STO estimate along with the two adjacent ones. This differs from the non-adaptive estimator which investigates all N candidate estimates. Especially for low SNR, the non-adaptive estimator is susceptible to STO estimates maximizing (Eq. 5) that differ largely from the true STO. This can be seen graph 500 shown in FIG. 6, which depicts a histogram of the timing error (defined to be $\hat{\theta}^*-\theta$) at the 50$^{th}$ received symbol. About 80% of the non-adaptive estimates result in an error of less than four samples, whereas the percentage is 95% for the method disclosed herein. Further, although not shown in FIG. 6, the largest error for the non-adaptive estimator is 33 samples, whereas the largest error is 7 samples for the disclosed method.

Figure 7:
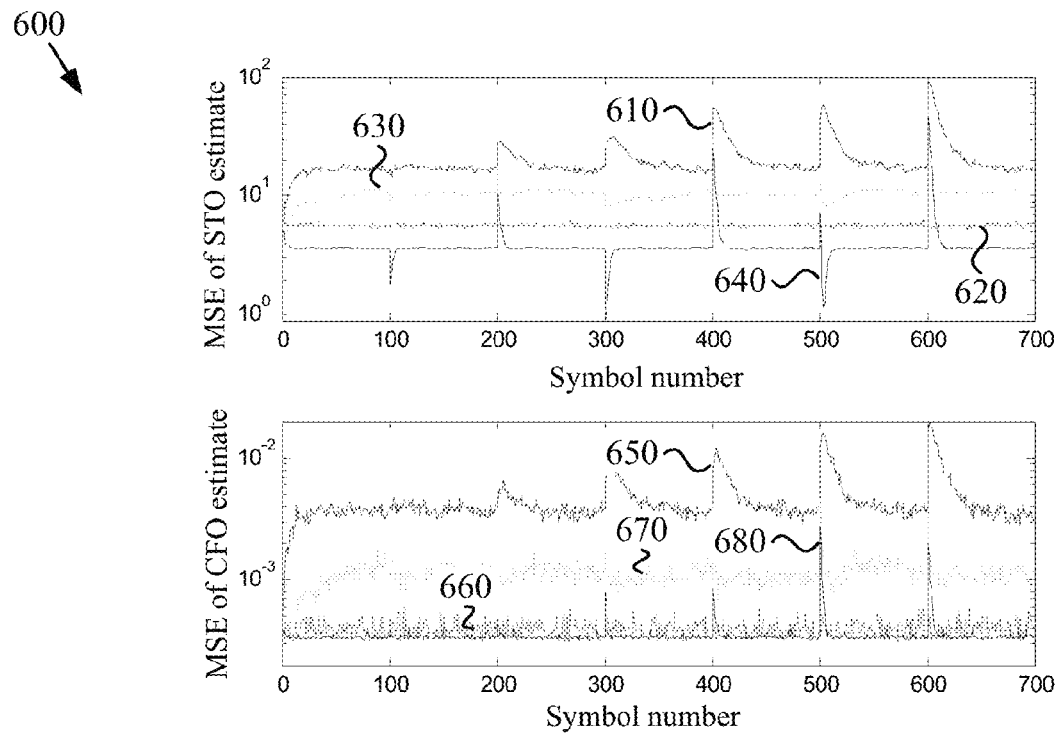
FIG. 7 shows a graph illustrating mean squared error performance, for a 3GPP Rax channel IEEE 802.11a ($E_s/N_o$=10 dB), for other estimators in comparison with a method in accordance with the Adaptive OFDM Synchronization Method Using Quadratic Search Step Sizes.
Figure 8:
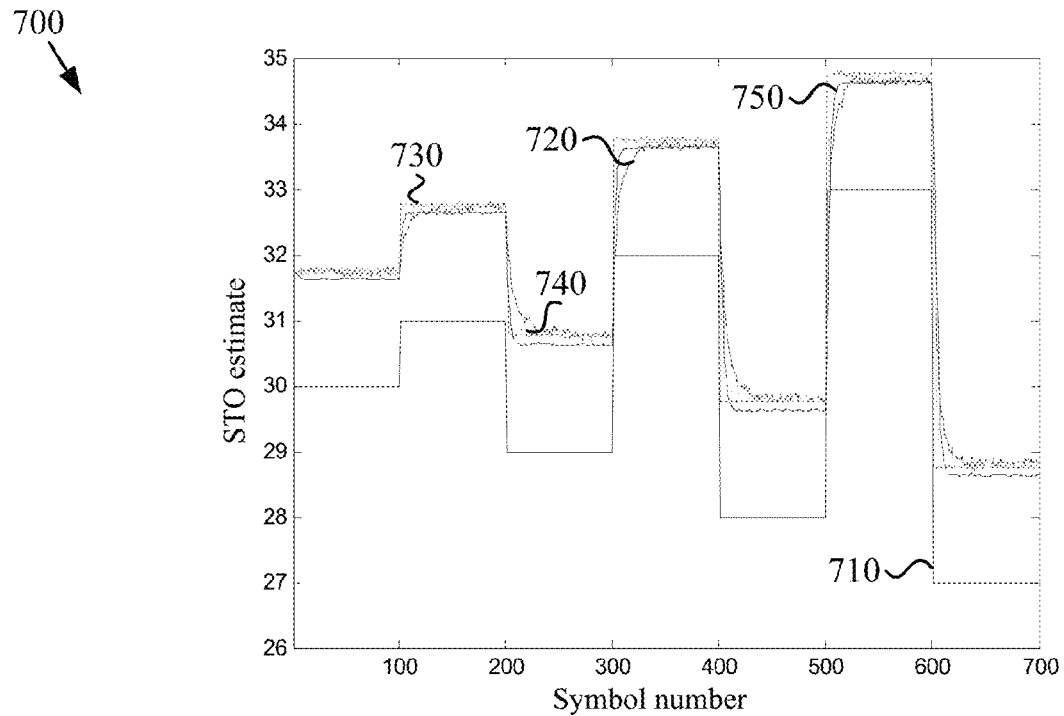
FIG. 8 shows a graph illustrating mean STO estimates, for a 3GPP Rax channel IEEE 802.11a ($E_s/N_o$=10 dB), for other estimators in comparison with a method in accordance with the Adaptive OFDM Synchronization Method Using Quadratic Search Step Sizes.

Continuing with the first scenario, FIGS. 7 and 8 show the MSE of the 10,000 STO and CFO estimates for each method and the mean STO estimate of 10,000 realizations, respectively for SNR=10 dB. Referring to graph 600 shown in FIG. 7, the disclosed method performs the best followed by the non-adaptive estimator, the Chen estimator, and the Krishnamurthy estimator, in terms of MSE.

The top graph of FIG. 7 shows the MSE of the STO estimate, with line 610 representing estimation performance of the Krishnamurthy estimator, line 620 representing estimation performance of the non-adaptive estimator, line 630 representing estimation performance of the Chen estimator, and line 640 representing estimation performance of the estimator disclosed herein. The bottom graph of FIG. 7 shows the MSE of the CFO estimate, with line 650 representing estimation performance of the Krishnamurthy estimator, line 660 representing estimation performance of the non-adaptive estimator, line 670 representing estimation performance of the Chen estimator, and line 680 representing estimation performance of the estimator disclosed herein. The difference between the disclosed method's and non-adaptive estimator's STO and CFO estimation performances is less than before due to the increase in SNR, which makes the non-adaptive estimator less susceptible to STO estimates that result in large timing errors.

Referring to graph 700 shown in FIG. 8, line 710 represents the true STO, line 720 represents the STO estimate of the Krishnamurthy estimator, line 730 represents the STO estimate of the non-adaptive estimator, line 740 represents the STO estimate of the Chen estimator, and line 750 represents the STO estimate from the method disclosed herein. The disclosed method has the smallest steady-state error. However, it should be noted that all of the algorithms exhibit a bias in that the steady-state error is more than a sample. This is explained by the fact that the CML cost function was derived under the assumption of a single path channel. However, in multipath channels, the inter-symbol interference occurring in the cyclic prefix causes the STO estimate $\hat{\theta}^*$ that maximizes (Eq. 5) to be greater than the true STO (i.e., $\hat{\theta}^*>\theta$).

The algorithms are defined to have converged once the steady-state values are within ±0.1 samples of each other. The convergence time (in symbols) for the adaptive algorithms is shown in Table 1 below at each change in STO. Except for the first two changes, the disclosed method has a shorter convergence time than the Chen estimator for all changes in STO, both of whom have shorter convergence times than the Krishnamurthy estimator.

TABLE 1

| Symbol Number where Change in STO Occurs | Krishnamurthy | Chen | Disclosed method |
|---|---|---|---|
| 100 | 19 | 3 | 4 |
| 200 | 28 | 4 | 6 |
| 300 | 25 | 13 | 7 |
| 400 | 29 | 15 | 9 |
| 500 | 20 | 16 | 9 |
| 600 | 29 | 19 | 12 |

In the second scenario, the performances of the methods for large changes in STO are simulated using the 3GPP Typical Urban channel (Tux) for LTE, which is effectively a fourth order channel. The true STO is given by $\theta=[60\vec{\mu}\ 20\vec{\mu}\ 100\vec{\mu}]^T$.

Figure 9:
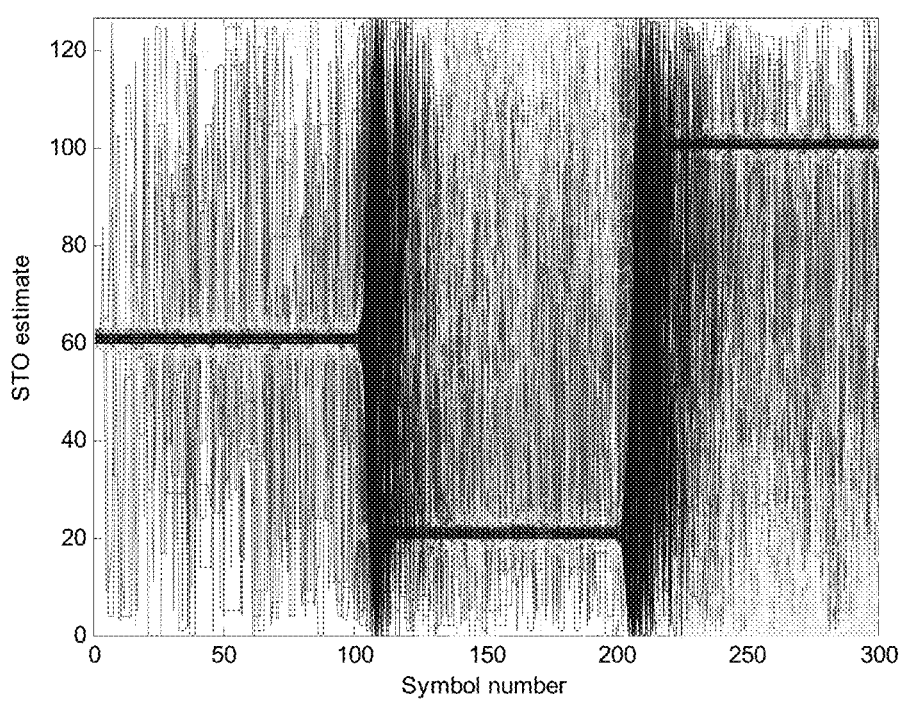
FIG. 9 shows a graph illustrating the STO estimates for a 3GPP Tux channel LTE ($E_s/N_o$=20 dB), for other estimators in comparison to a method in accordance with the Adaptive OFDM Synchronization Method Using Quadratic Search Step Sizes.

FIG. 9 shows a graph 800 the STO estimates of 100 realizations of each algorithm for SNR=20 dB. As shown in FIG. 9, the proposed algorithm (the blue line initially starting near a STO estimate of 60) tracks the true STO the best and converges for every realization. In 96 of the 100 realizations, the disclosed method reaches within one sample of its steady-state estimate in less than 40 symbols. The Krishnamurthy estimator fluctuates and there are many realizations where the Chen estimator permanently diverges. The disclosed method takes longer to converge in the second scenario than in the first scenario because the large changes in STO cause the cost function to drop below the threshold λ, resulting in larger (and sometimes random) search step sizes. In the first scenario, the disclosed method rarely used search step sizes larger than one.

The above results demonstrate that the disclosed method is robust to both small and large changes in STO, has quicker convergence times than previously proposed adaptive algorithms, and performs better in terms of MSE once the algorithm has converged. The Krishnamurthy estimator suffers from the candidate STO estimate being selected randomly which can lead to large fluctuations and long convergence times, while the Chen estimator suffers from the difficulty in finding a value of $\alpha_{gate}$ that robustly tracks large changes in STO.

Figure 10:
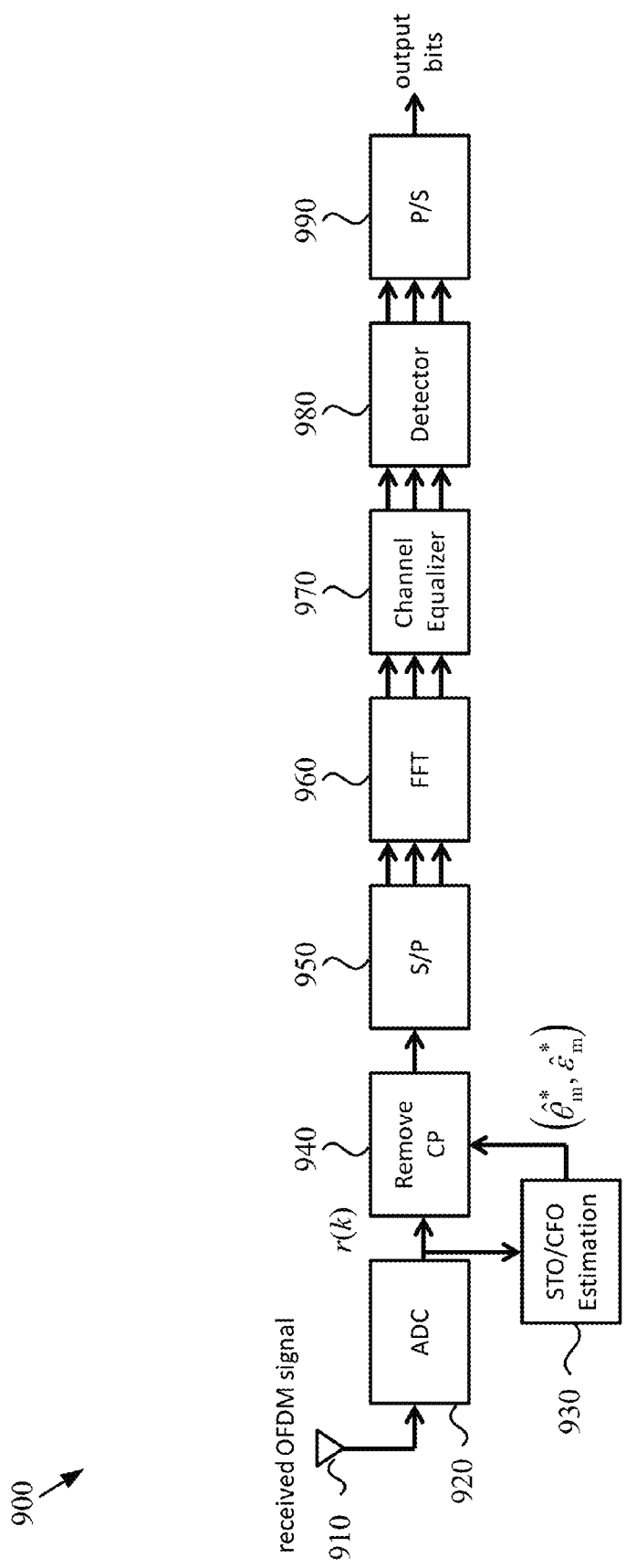
FIG. 10 shows a diagram of an embodiment of an OFDM receiver system that may be used to implement embodiments of methods in accordance with the Adaptive OFDM Synchronization Method Using Quadratic Search Step Sizes.

FIG. 10 shows a diagram of an embodiment of an OFDM receiver system 900 that may be used to implement the embodiments of the methods in accordance with the Adaptive OFDM Synchronization Method Using Quadratic Search Step Sizes. System 900 may include antenna 910 that receives an OFDM signal such as signal 10 shown in FIG. 1. The received signal may then be converted to digital form using analog-to-digital converter (ADC) 920. The output of ADC 920 is sent to the STO/CFO estimation block 930 and block 940. The output block 930 is a STO and CFO estimate, and based upon this estimate, the cyclic prefix of the OFDM symbol is removed at block 940.

After removal of the cyclic prefix, the serial stream of OFDM symbols are reshaped into N parallel streams 950, upon which a Fast Fourier Transform (FFT) is performed 960. After the FFT 960, a channel equalizer 970 removes the channel's effect on the OFDM symbol in the frequency domain. The output of channel equalizer 970 is demodulated 980, where the OFDM symbols are converted into binary data, and the N parallel streams of binary data are reshaped into one serial stream 990. The processing performed in blocks 930-990 may be performed by a processor that is connected to ADC 920.

Figure 11:
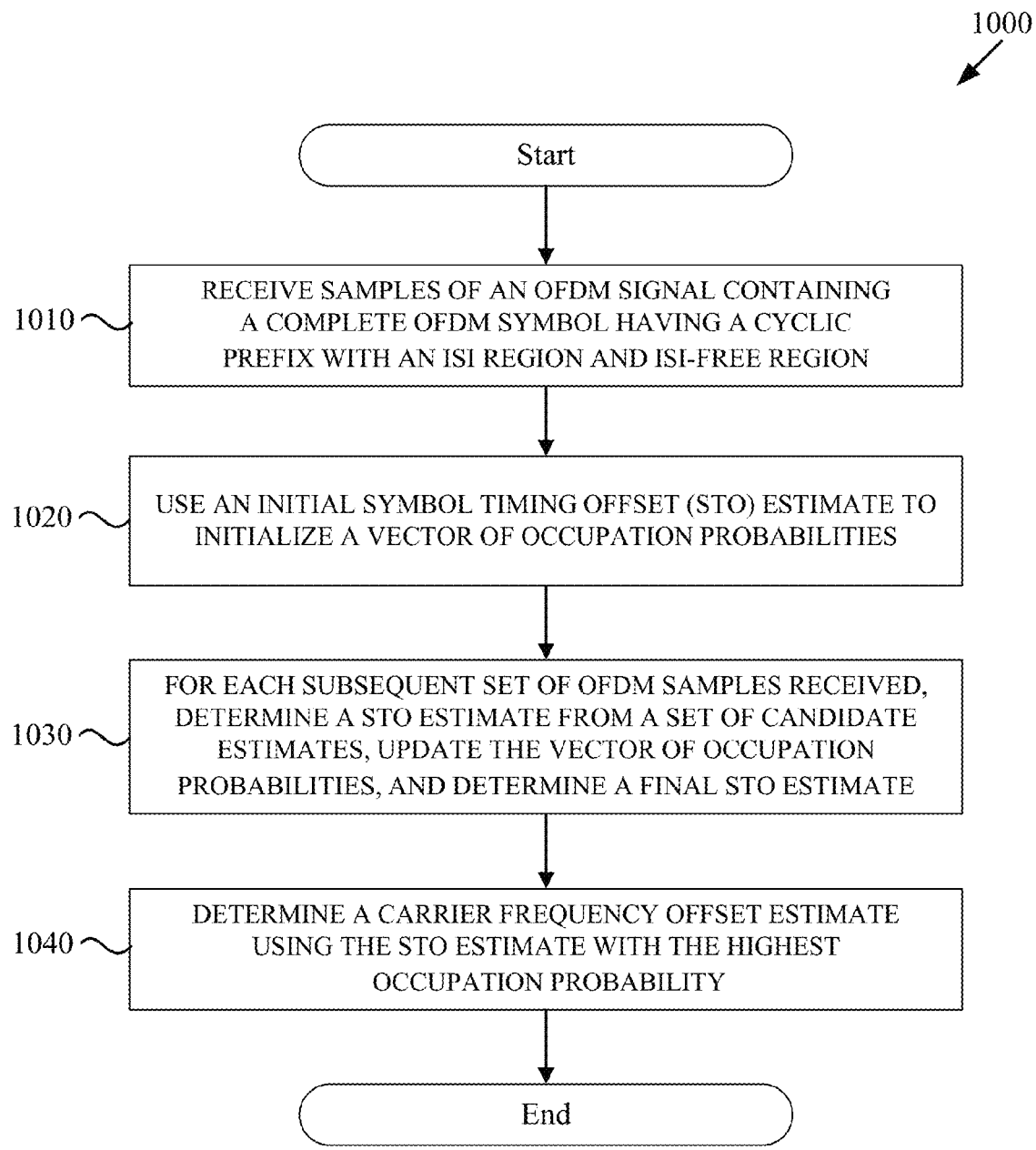
FIG. 11 shows a flowchart of an embodiment of a method in accordance with the Adaptive OFDM Synchronization Method Using Quadratic Search Step Sizes.

FIG. 11 shows a flowchart of an embodiment of a method 1000 in accordance with the Adaptive OFDM Synchronization Method Using Quadratic Search Step Sizes. As an example, method 1000 may be performed by system 900 as shown in FIG. 10, using signal 10 as shown in FIG. 1, and will be discussed with reference thereto. Further, while FIG. 11 shows one embodiment of method 1000 to include steps 1010-1040, other embodiments of method 1000 may contain fewer or more steps. Further, while in some embodiments the steps of method 1000 may be performed as shown in FIG. 11, in other embodiments the steps may be performed in a different order, or certain steps may occur simultaneously with one or more other steps.

Method 1000 may begin with step 1010, which involves receiving a plurality of samples of at least one transmitted OFDM signal, such as signal 10 shown in FIG. 1. As an example, the samples may be received at box 930 in FIG. 10. The samples contain at least one complete OFDM symbol 20 including data samples in data portion 40 and a cyclic prefix 30 comprising inter-symbol interference (ISI) samples in ISI region 32 and one or more ISI-free samples in region 34.

Step 1020 involves using an initial symbol timing offset (STO) estimate $\hat{\theta}_0^*$ to initialize an N×1 vector of occupation probabilities a, where N is the number of sub-carriers of the OFDM signal. In some embodiments, the initial STO estimate $\hat{\theta}_0^*$ and an initial carrier frequency offset (CFO) estimate $\hat{\epsilon}_0^*$ are determined using at least $2N+N_{cp}$ samples, where $N_{cp}$ is the length of the cyclic prefix.

Step 1030 involves for each subsequent set m of OFDM samples received containing at least one complete OFDM symbol, determining a STO estimate $\hat{\theta}_m$ from a set of candidate STO estimates, updating the vector of occupation probabilities a, and determining a final STO estimate $\hat{\theta}_m^*$. In some embodiments, determining a STO estimate $\hat{\theta}_m$ from a set of candidate STO estimates comprises selecting a STO estimate $\hat{\theta}_m$ yielding the maximum cost function from the set of candidate STO estimates $\{\hat{\theta}_{m-1}^*-s, \hat{\theta}_{m-1}^*, \hat{\theta}_{m-1}^*+s\}$ if a search step size s is not equal to zero and from the set of candidate STO estimates $\{\hat{\theta}^{(1)}, \hat{\theta}_{m-1}^*, \hat{\theta}^{(2)}\}$ if s is equal to zero, wherein $\hat{\theta}^{(1)}$ and $\hat{\theta}^{(2)}$ are uniformly distributed random STO estimates on [0,N−1] and $\hat{\theta}^{(1)} \neq \hat{\theta}^{(2)} \neq \hat{\theta}_{m-1}^*$. In some embodiments, the cost function of the STO estimate $\hat{\theta}_m$ is used to determine s. In some embodiments, the N×1 vector of occupation probabilities α is updated according to $$\alpha_m = \alpha_{m-1} + \mu(e_{\hat{\theta}_m} - \alpha_{m-1}),$$

where $e_{\hat{\theta}_m}$ is a N×1 unit vector with a one in the $\hat{\theta}_m$ position and μ is the step-size. In some embodiments, the final STO estimate $\hat{\theta}_m^*$ is determined using the STO estimate with the highest occupation probability according to $\hat{\theta}_m^* = \hat{\theta} \in [0,N-1]^{arg\ max} \alpha_m$.

Step 1040 involves determining a CFO estimate $\hat{\epsilon}_m^*$ using the STO estimate with the highest occupation probability according to $$\hat{\epsilon}_m^* = -\frac{1}{2\pi}\arg\left\{\sum_{k=\hat{\theta}_m^*}^{\hat{\theta}_m^*+N_{cp}-1} r(k)r^*(k+N)\right\},$$

where $N_{cp}$ is the length of the length of the cyclic prefix, k is an indexing variable, r is the received OFDM samples, and r* is a complex conjugate of r.

Method 1000 may be implemented as a series of modules, either functioning alone or in concert, with physical electronic and computer hardware devices. Method 1000 may be computer-implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Adaptive OFDM Synchronization Method Using Quadratic Search Step Sizes are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A method comprising the steps of:
   receiving, at an antenna of a receiver system, a plurality of samples of at least one orthogonal frequency division multiplex (OFDM) signal, the samples containing at least one complete OFDM symbol including data samples and a cyclic prefix;
   using an analog-to-digital converter (ADC) operatively connected to the antenna to convert the samples of the OFDM signal into digital samples;
   using a processor operatively connected to the ADC to perform the steps of using an initial symbol timing offset (STO) estimate $\hat{\theta}_0^*$ to initialize an N×1 vector of occupation probabilities $\alpha$, where N is the number of sub-carriers of the OFDM signal, for each subsequent set m of OFDM samples received containing at least one complete OFDM symbol, determining a STO estimate $\hat{\theta}_m$ from a set of candidate STO estimates, updating the vector of occupation probabilities $\alpha$, and determining a final STO estimate $\hat{\theta}_m^*$, and removing the cyclic prefix from the OFDM symbol based upon the final STO estimate $\hat{\theta}_m^*$.

2. The method of claim 1, wherein the initial STO estimate $\hat{\theta}_0^*$ and an initial carrier frequency offset (CFO) estimate $\hat{\epsilon}_0^*$ are determined using at least $2N+N_{cp}$ samples, where $N_{cp}$ is the length of the cyclic prefix.

3. The method of claim 1, wherein the step of determining a STO estimate $\hat{\theta}_m$ from a set of candidate STO estimates comprises selecting a STO estimate $\hat{\theta}_m$ yielding a maximum cost function from the set of candidate STO estimates $\{\hat{\theta}_{m-1}^*-s, \hat{\theta}_{m-1}^*, \hat{\theta}_{m-1}^*+s\}$ if a search step size s is not equal to zero and from the set of candidate STO estimates $\{\hat{\theta}^{(1)}, \hat{\theta}_{m-1}^*, \hat{\theta}^{(2)}\}$ if s is equal to zero, wherein $\hat{\theta}^{(1)}$ and $\hat{\theta}^{(2)}$ are uniformly distributed random STO estimates on [0,N−1] and $\hat{\theta}^{(1)} \neq \hat{\theta}^{(2)} \neq \hat{\theta}_{m-1}^*$.

4. The method of claim 3, wherein the cost function of the STO estimate $\hat{\theta}_m$ is used to determine s.

5. The method of claim 1, wherein the N×1 vector of occupation probabilities $\alpha$ is updated according to $$\alpha_m = \alpha_{m-1} + \mu(e_{\hat{\theta}_m} - \alpha_{m-1}),$$

where $e_{\hat{\theta}_m}$ is a N×1 unit vector with a one in the $\hat{\theta}_m$th position and $\mu$ is the step-size.

6. The method of claim 1, wherein the final STO estimate $\hat{\theta}_m^*$ is determined using the STO estimate with the highest occupation probability according to $$\hat{\theta}_m^* = \underset{\hat{\theta} \in [0, N-1]}{\arg\max} \, \alpha_m.$$

7. The method of claim 6 further comprising the step of determining a CFO estimate $\hat{\epsilon}_m^*$ using the STO estimate with the highest occupation probability according to $$\hat{\epsilon}_m^* = -\frac{1}{2\pi} \arg\left\{\sum_{k=\hat{\theta}_m^*}^{\hat{\theta}_m^* + N_{cp} - 1} r(k) r^*(k+N)\right\},$$

where $N_{cp}$ is the length of the length of the cyclic prefix, k is an indexing variable, r is the received OFDM samples, and r* is a complex conjugate of r.

8. The method of claim 1 further comprising the step of comparing a cost function of the final STO estimate $J(\hat{\theta}_m^*)$ to a threshold $\lambda$.

9. The method of claim 8, wherein if $J(\hat{\theta}_m^*) > \lambda$, the method further comprises the steps of setting s to one and setting $\eta$, a value used to keep track of the intervals in sets of OFDM samples, to zero.

10. The method of claim 8, wherein if $J(\hat{\theta}_m^*) \leq \lambda$, the method further comprises the step of incrementing $\eta$, a value used to keep track of the intervals in sets of OFDM samples, by one.

11. The method of claim 10 further comprising the steps of determining that $\eta > 1$ and setting $s = \eta^2$.

12. The method of claim 11 further comprising the steps of determining that $s > N/2$ and setting $s = 0$.

13. A system comprising:
   an antenna configured to receive a plurality of samples of at least one orthogonal frequency division multiplex (OFDM) signal, the samples containing at least one complete OFDM symbol including data samples and a cyclic prefix;
   an analog-to-digital converter (ADC) operatively connected to the antenna, the ADC configured to convert the samples of the OFDM signal into digital samples; and
   a processor, operatively connected to the ADC, configured to use an initial symbol timing offset (STO) estimate $\hat{\theta}_0^*$ to initialize an N×1 vector of occupation probabilities $\alpha$, where N is the number of sub-carriers of the OFDM signal, for each subsequent set m of OFDM samples received containing at least one complete OFDM symbol, determine a STO estimate $\hat{\theta}_m$ from a set of candidate STO estimates, update the vector of occupation probabilities $\alpha$, and determine a final STO estimate $\hat{\theta}_m^*$, and remove the cyclic prefix from the OFDM symbol based upon the final STO estimate $\hat{\theta}_m^*$.

14. The system of claim 13, wherein the processor is configured to determine the initial STO estimate $\hat{\theta}_0^*$ and the initial CFO estimate $\hat{\epsilon}_0^*$ using at least $2N+N_{cp}$ samples, where $N_{cp}$ is the length of the cyclic prefix.

15. The system of claim 13, wherein the processor is configured to determine the STO estimate $\hat{\theta}_m$ from a set of candidate STO estimates by selecting a STO estimate $\hat{\theta}_m$ yielding a maximum cost function from the set of candidate STO estimates $\{\hat{\theta}_{m-1}^*-s, \hat{\theta}_{m-1}^*, \hat{\theta}_{m-1}^*+s\}$ if a search step size s is not equal to zero and from the set of candidate STO estimates $\{\hat{\theta}^{(1)}, \hat{\theta}_{m-1}^*, \hat{\theta}^{(2)}\}$ if s is equal to zero, wherein $\hat{\theta}^{(1)}$ and $\hat{\theta}^{(2)}$ are uniformly distributed random STO estimates on [0,N−1] and $\hat{\theta}^{(1)} \neq \hat{\theta}^{(2)} \neq \hat{\theta}_{m-1}^*$, wherein the cost function of the STO estimate $\hat{\theta}_m$ is used to determine s.

16. The system of claim 13, wherein the processor is configured to update the N×1 vector of occupation probabilities $\alpha$ according to $$\alpha_m = \alpha_{m-1} + \mu(e_{\hat{\theta}_m} - \alpha_{m-1}),$$

where $e_{\hat{\theta}_m}$ is a N×1 unit vector with a one in the $\hat{\theta}_m$th position and $\mu$ is the step-size.

17. The system of claim 13, wherein the processor is configured to determine the final STO estimate $\hat{\theta}_m^*$ using the STO estimate with the highest occupation probability according to $$\hat{\theta}_m^* = \underset{\hat{\theta} \in [0,N-1]}{\arg\max} \alpha_m.$$

18. The system of claim 17, wherein the processor is further configured to determine a CFO estimate $\hat{\epsilon}_m^*$ using the STO estimate with the highest occupation probability according to $$\hat{\epsilon}_m^* = -\frac{1}{2\pi}\arg\left\{\sum_{k=\hat{\theta}_m^*}^{\hat{\theta}_m^*+N_{cp}-1} r(k)r^*(k+N)\right\},$$

where $N_{cp}$ is the length of the length of the cyclic prefix, k is an indexing variable, r is the received OFDM samples, and r* is a complex conjugate of r.

19. The system of claim 13, wherein the processor is further configured to compare a cost function of the final STO estimate $J(\hat{\theta}_m^*)$ to a threshold $\lambda$.

20. The system of claim 19, wherein if $J(\hat{\theta}_m^*) > \lambda$, the processor is further configured to set s to one and set $\eta$, a value used to keep track of the intervals in sets of OFDM samples, to zero, wherein if $J(\hat{\theta}_m^*) \leq \lambda$, the processor is further configured to increment $\eta$ by one, determine if $\eta > 1$ and if so, set $s=\eta^2$, and to further determine if $s > N/2$, and if so, set $s=0$.

* * * * *